(12) United States Patent
Tamminen et al.

(10) Patent No.: US 8,974,640 B2
(45) Date of Patent: *Mar. 10, 2015

(54) FEED SECTION OF A SEPARATION COLUMN

(75) Inventors: Esa Tamminen, Porvoo (FI); Matti Happonen, Porvoo (FI); Ulla Happonen, legal representative, Porvoo (FI); Simo Jortikka, Helsinki (FI); Martti Ruskoaho, Helsinki (FI)

(73) Assignee: Neste Oil Oyj, Espoo (FI)

( * ) Notice: Subject to any disclaimer, the term of this patent is extended or adjusted under 35 U.S.C. 154(b) by 736 days.

This patent is subject to a terminal disclaimer.

(21) Appl. No.: 13/162,601

(22) Filed: Jun. 17, 2011

(65) Prior Publication Data

US 2011/0308932 A1  Dec. 22, 2011

Related U.S. Application Data

(60) Provisional application No. 61/356,668, filed on Jun. 21, 2010.

(30) Foreign Application Priority Data

Jun. 21, 2010 (EP) .................................. 10166662

(51) Int. Cl.
  *B01D 3/14* (2006.01)
  *B01D 3/00* (2006.01)
  (Continued)

(52) U.S. Cl.
  CPC ............ *B01D 3/008* (2013.01); *B01D 19/0036* (2013.01); *B01D 19/0094* (2013.01);
  (Continued)

(58) Field of Classification Search
  CPC ............ B01D 3/008; B01D 3/06; B01D 3/14; B01D 3/32; B01D 19/0036; B01D 19/0063; B01D 19/0094

USPC ............ 202/158, 262; 203/88; 196/100, 135; 208/352, 361; 261/19, 78.2, 114.5, 261/115; 95/193, 200
See application file for complete search history.

(56) References Cited

U.S. PATENT DOCUMENTS 2,805,981 A  9/1957  Cavin et al.
2,995,499 A  8/1961  Dukler et al.
(Continued)

FOREIGN PATENT DOCUMENTS

EP  0188387 A2  7/1986
FR  2875145 A1  3/2006
(Continued)

OTHER PUBLICATIONS

European Search Report of Dec. 15, 2010.
(Continued)

*Primary Examiner* — Prem C Singh
*Assistant Examiner* — Jonathan Miller
(74) *Attorney, Agent, or Firm* — Seppo Laine Oy; Joshua P. Wert

(57) ABSTRACT

The present invention relates to a feed distribution device in separation columns and a method of operation. In particular it relates to distillation columns in which the feed stream is substantially liquid phase, or a mixture of gas and liquid upstream of the column, but where the feed vaporizes or vaporizes more when it enters the column. More specifically, the feed distribution device contains a plurality of opening which allow the feed to vaporize inside the column and where the openings are maintained in critical condition during operation. Significant advantage is achieved through the implementation and use of the present feed distribution device.

10 Claims, 3 Drawing Sheets

(51) Int. Cl.
  *B01D 19/00* (2006.01)
  *B01D 1/06* (2006.01)
  *B01D 3/06* (2006.01)
  *B01D 3/20* (2006.01)
  *B01D 3/32* (2006.01)

(52) U.S. Cl.
  CPC ............ *B01D19/0063* (2013.01); *B01D 3/14* (2013.01); *B01D 1/06* (2013.01); *B01D 3/06* (2013.01); *B01D 3/20* (2013.01); *B01D 3/32* (2013.01)
  USPC ........... 202/158; 202/262; 196/100; 196/135; 261/19; 261/78.2; 261/114.5; 261/115; 95/193; 95/200

(56) References Cited

U.S. PATENT DOCUMENTS

| | | | | |
|---|---|---|---|---|
| 3,057,786 | A | * | 10/1962 | Waddill ........................ 203/20 |
| 4,264,538 | A | * | 4/1981 | Moore et al. .................... 261/97 |
| 4,290,980 | A | * | 9/1981 | Pikon et al. ..................... 261/94 |
| 4,770,747 | A | | 9/1988 | Muller |
| 4,816,191 | A | * | 3/1989 | Berven et al. ................... 261/97 |
| 5,173,093 | A | | 12/1992 | Johnson et al. |
| 6,007,604 | A | * | 12/1999 | Risse ................................ 95/13 |
| 6,058,623 | A | * | 5/2000 | Brooks et al. .................... 34/362 |
| 6,068,730 | A | * | 5/2000 | Ramm-Schmidt et al. .. 159/43.1 |

FOREIGN PATENT DOCUMENTS

| | | |
|---|---|---|
| GB | 747527 | 4/1956 |
| WO | WO9101169 A1 | 2/1991 |

OTHER PUBLICATIONS

International Search Report of Sep. 21, 2011.
Kister H.Z. et al: "Troubleshooting a packing maldistribution upset" Chemical Engineering Research and Design, 2007, vol. 85, No. 1A, pp. 136-143.

* cited by examiner

FEED SECTION OF A SEPARATION COLUMN

FIELD OF INVENTION

The present invention generally relates to separation columns. In particular it relates to distillation columns in which the feed stream is liquid phase, or a mixture of gas and liquid upstream of the column, but where the feed vaporizes or vaporizes more when it enters the column. Such columns contain a section of the column into which a feed flow is directed from one or more inlets. There is a need in the field to improve the introduction of the feed stream to such columns and to improve the feed distribution into such sections.

GENERAL DESCRIPTION OF THE ART

Flashing is a common phenomenon in distillation columns where at least a portion of a feed stream changes phases when reduced to the prevailing pressure inside the column. The resultant feed stream entering the column is then a gas/liquid mixture. Based on the processing requirements it has proven difficult in application to efficiently and effectively introduce such a feed to a column.

When there is an upper separation section, at least one section above the feed input location, one requirement is that the gas portion of the feed stream needs to be distributed uniformly to the upper separation section. A related requirement is that there is ideally no local velocity peaks of the gas flow. When there is a lower separation section, at least one section below the feed input location, a requirement is that any liquid portion of the feed stream needs to be collected and directed to the lower separation section. The lower separation section may contain a specific location such as an inlet to a liquid distributor.

Another factor concerning the efficiency and effectiveness of introducing the feed stream to the column is any gas flow coming up from a lower separation section as a result of any separation activity of the lower section. The upcoming gas flow needs to pass through the section where the feed is introduced and then to the upper separation section. To operate ideally, the gas portion produced from the feed stream and the upcoming gas flow need to be mixed completely to produce a single uniform gas which does not have variations in either composition or in temperature across the cross-sectional area of the upper separation section.

Currently, one industry practice is to avoid large amounts of flashing inside columns by reducing the pressure of feed streams before introducing the feed to the column. This is accomplished with a device upstream of the column which reduces the pressure of the feed stream to those desired in the column itself The feed stream exiting the upstream device and traveling to the column normally via a pipe is a gas/liquid mixture having a significant fraction of gas. The large amount of gas means that either the pipe has to have a relatively large diameter in order to keep the flow velocity of the gas/liquid mixture low inside the pipe, or in the case that the diameter of the pipe is small the resulting flow has an undesirably high velocity inside the pipe.

Having a large pipe is undesirable because it requires a greater height of the feed stream section of the column. This increases the overall height necessary for the column which adversely impacts design cost, building cost, operation costs and maintenance costs. The routing of large pipe is also more difficult, takes up greater amounts of space and is more expensive. The drawback to having small pipes is the increased risk of erosion problems due to high flow velocity and other characteristics of the gas/liquid mixture.

Usually, the upstream device is a flow control means in the form of a control valve. The control valve facilitates the major part of the pressure reduction. The significant fraction of gas produced by this pressure reduction step imposes additional problems in the design and sizing of such valves. This is due to the outlet conditions being very different from the inlet conditions. Due to the two phase flow (gas/liquid mixture) the location of the valve upstream of the column as well as the piping downstream of the valve must be designed with care in order to avoid the problems created by flow instability and erosion.

Examples and discussion of current industry practice can be found in Distillation Operation by H. Kister, (book published by McGraw-Hill, ISBN 0-07-034910-X) with FIG. 2.2j specifically, which explains using a tangential entry to the column in order to satisfy the processing requirements described above.

Packed Tower Design and Applications by R. F. Strigle Jr, (book published by Gulf Publishing Co in 1994 [2nd Ed.], ISBN 0-88415-179-4) gives some examples in FIGS. 10-15 and 10-16 for feed streams that produce gas/liquid mixtures when pressure of the feed stream is reduced to that of the column. One example utilizes a chamber where the flashing takes place. In a second example, a circular channel along the walls of the column has been provided and the feed is directed above and into that channel. Both examples are being applied to columns with small diameter.

Some specific examples where the above described conditions concerning flashing feed streams are particularly prevalent are in oil refineries and petrochemical plants; particularly in atmospheric and pressure distillation columns, and specifically in the vacuum distillation columns. More generally, a specific location in some vacuum distillation columns is the reboiler return to the column, where the gas/liquid mixture is introduced to the column from a reboiler, where the reboiler serves as vaporization means.

One of ordinary skill in the art will recognize that the above described conditions and associated problems are present to at least some degree in all contacting devices where a flashing feed is present in the system.

SUMMARY OF THE INVENTION

An object of the present invention is to facilitate the introduction and distribution of a flashing feed stream to a contacting device column.

It is an object to provide a feed distribution device which substantially prevents the flashing of the feed stream until it exists the feed distribution device by maintaining the pressure of the feed stream high enough. The maintaining of the pressure is achieved by arranging holes with sufficient pressure drop to the said feed distribution device in which the flashing or vaporization takes place. More specifically, the flashing of the feed stream substantially occurs when the stream flows through the holes and the flow through the holes is in choked (or critical) conditions.

Additionally, it is an object of the present invention to provide a feed distribution device which can be used to distribute the gas produced by flashing of the feed more evenly along the cross-sectional area of a separation section above the feed location compared to the distribution with no or other feed distribution devices.

An additional object of the present invention is, alone or in conjunction with distributing the feed more evenly, to use the feed distribution device to reduce the maximum magnitude of local velocity of at least a portion of the gas flashed from the feed as it is introduced to a separation section above the feed location.

A further object of the present invention is to facilitate ideal mixing of the gas produced by flashing of a feed uniformly with gas coming from a separation section below the feed inlet section.

The objects of the present invention are achieved by the apparatus and method which is described in more detail below.

DETAILED DESCRIPTION OF EXEMPLARY EMBODIMENTS

There are numerous types and variations of contacting device columns. Some of the standard contacting device columns are distillation columns, stripping columns and absorption columns. In addition to columns with a single purpose, many contacting columns are combinations of two or more standard processes (i.e. distillation and absorption). Further, there are categories such as packed columns and vacuum columns. One of ordinary skill in the art will recognize the applicability for the present invention in all of the types and variations of contacting devices enumerated above in addition to those not specifically enumerated but art recognized, where such flashing feed conditions have at least the potential to exist.

Figure 1:
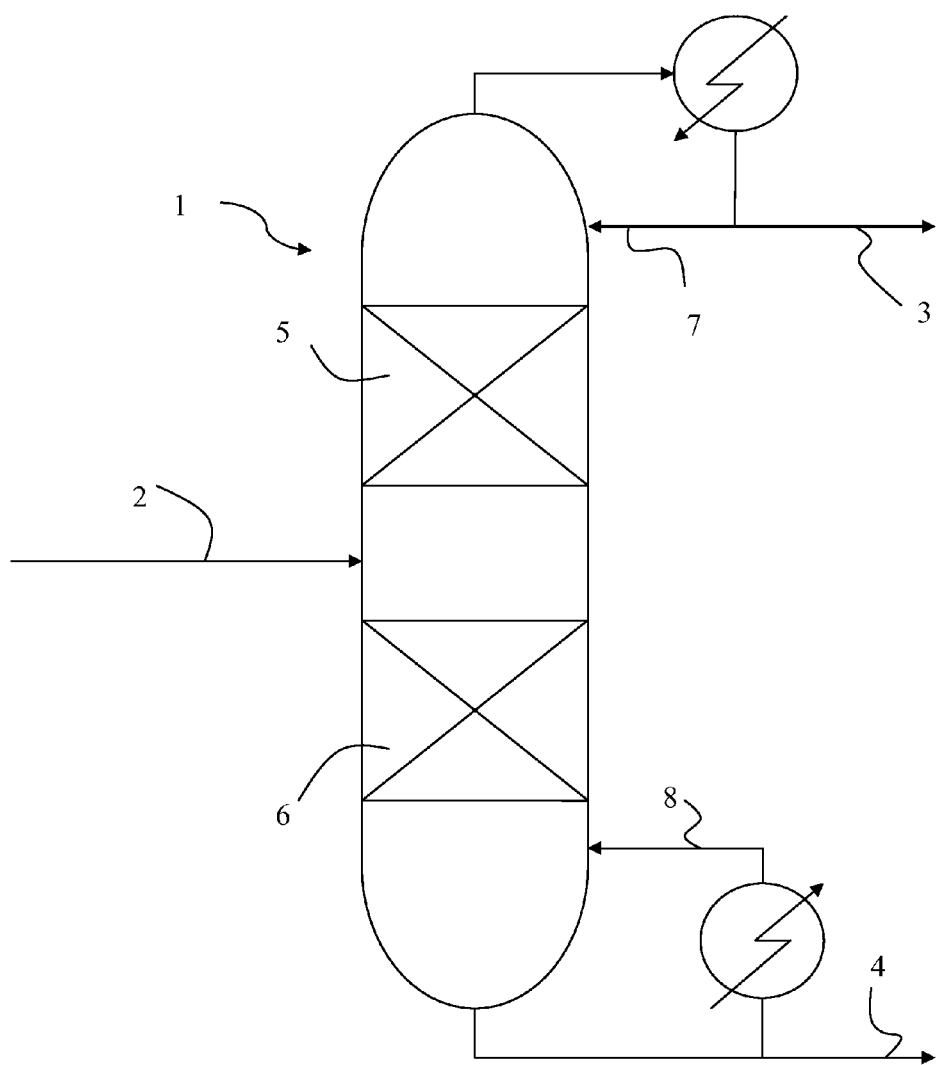
FIG. 1 is a schematic of a distillation column.

FIG. 1 shows a contacting device column 1 as a vacuum distillation column with one main feed inlet 2 and two outlets 3 and 4. One outlet is provided for each product to be separated from the feed by the separation sections, 5 provided above and 6 provided below the main feed inlet location. In addition to the main feed 2, there is a return feed inlet 7, reflux, located above the main feed inlet and a feed inlet 8, reboiler return, located in the lower section of the column. For simplicity, the system producing the vacuum has been omitted.

Figure 2A:
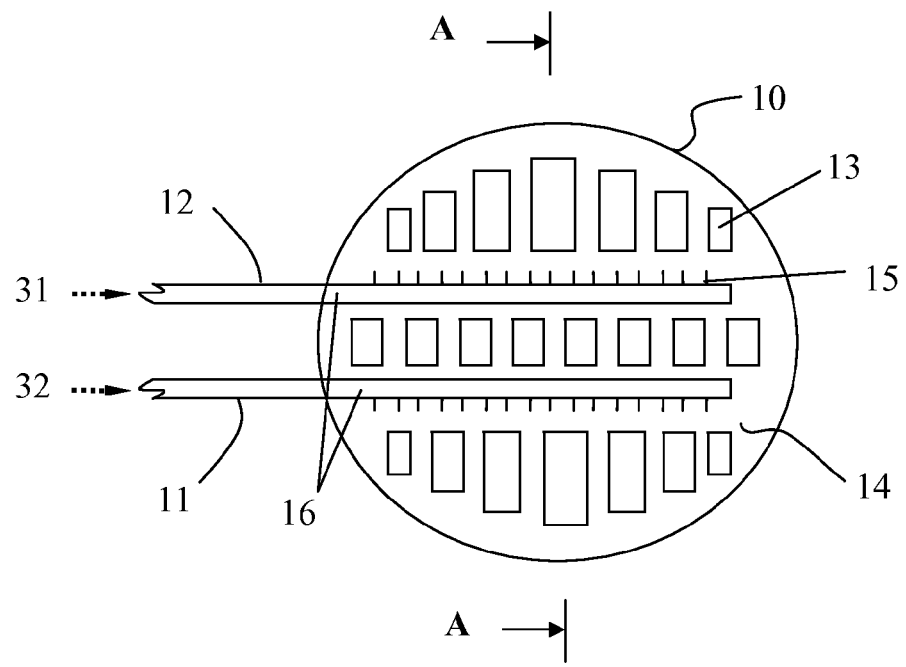
FIG. 2A is a top-down view of a section of a column with a feed distribution device including a chimney tray.
Figure 2B:
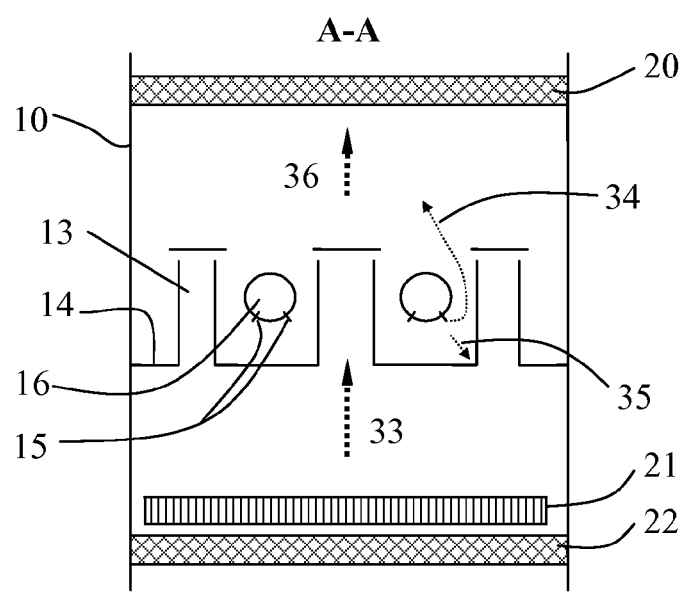
FIG. 2B is a side-view representation of the section in FIG. 2A.

A feed inlet section is presented in more detail in FIGS. 2A and 2B. FIG. 2A shows the sidewall of a contacting device column 10 which encloses the interior portion of the contacting device column, feed inlet devices 11 and 12, a chimney tray with tray floor panels 14 and suitable number of chimneys 13. The feed inlet devices 11 and 12 located outside of the contacting device column are attached to feed flow path devices 16 inside the column. Feed flow path devices 16 have a suitable number of holes 15 located at their outer and inner walls, and are located above the chimney tray floor 14.

A key feature of the feed flow path devices is that the feed stream flow through the holes is in critical (choked) condition. The flow chokes at the holes and this choking sets maximum flow rate that can be achieved through the hole.

Feed flows through the feed inlet devices at a mass flow rate and at a first pressure. The contacting column is kept at a second pressure which is lower than the first. When the feed exits the feed flow path device coupled to the feed inlet, based on the pressure differential the liquid portion of the feed will expand, vaporize and the feed will enter the column from each opening and the feed flow through the holes is in critical (choked) conditions.

Based on the mass flow rate in the feed inlet, there is a point where the differential between the first pressure and the second pressure in the column no longer affects the amount of feed entering the contacting column. This is because no more feed can possible exit the feed flow path device openings due to the choking phenomenon. The point where lowering the second pressure does not have an effect on the amount of feed entering the column through the holes is defined as the critical point. For all second pressures from the critical point to all pressures below the critical point, the flow through the holes is considered to be in critical or choked condition.

Therefore, the size of each opening in the feed flow path device, and the total area of the openings in the feed flow path device, must be such that critical conditions are achieved for the flow through the holes. These sizes will vary from one installation to another and the sizes are chosen to specifically work with the operating conditions in each installation. The selection of the size of each opening, the total number of openings and the overall opening area can be chosen through standard calculations or with the aid of tools such as Computational Fluid Dynamics software.

When the feed flow is in critical (choked) condition the only means for increasing the maximum flow rate are to increase the total hole area or increase first pressure.

Feed streams 31 and 32 enter their respected feed inlet devices 11 and 12 outside of the wall of the contacting column. In the present example, feed inlet devices 11 and 12 are circular pipes having similar diameters. Additionally, the feed flow path devices 16 are circular pipes having the same diameter as the feed inlet devices. The feed inlet devices outside the column wall and the feed flow path devices inside the column wall can be continuous, as shown in FIG. 2A, or they can be separate and coupled at or near the column wall, not shown. The feed distribution device of the present invention comprises the feed flow path devices 16 located inside the column walls and their respective openings 15.

The feed distribution device may be used in conjunction with a chimney tray or alternatively, other devices known to a person skilled in the art can be used. Such known devices can be a ring channel, several suitably located flash boxes, or other geometries which enable the gas coming from the separation section below to pass through the feed section and collecting the liquid resulting from the feed distribution device and from the separation section above (if such section exists).

The feed flow path devices 16 shown in FIG. 2A are straight, parallel pipes. While the feed flow path devices are shown as being multiple, distinct pipes, they can also be two or more branches of a single pipe connected to a single feed inlet or feed inlet coupling means. Similarly, the two distinct straight pipes can comprise one or more branches. Numerous geometric designs are possible based on the design of the contacting column, the flow properties of the particular feed as well as the desired distribution of the feed in the column section.

The size and number of the holes 15 are selected in such a way that the feed inlet stream inside flow path device 16 is maintained substantially in liquid phase. Alternatively, the feed stream has a very small fraction of gas in it. The inlet stream as it flows through the holes 15 into the feed inlet section vaporizes or vaporizes more and is simultaneously in choked conditions.

Shown in FIG. 2B, as the gas/liquid mixture comes out from the holes 15 it produces a gas stream 34 as a result of flashing (vaporization) and a liquid stream 35. In this particular embodiment, by using two flow path devices as shown it is possible to ensure that the gas stream 34 produced by flashing and the gas stream 33 coming through the chimneys are mixed uniformly into a combined gas stream 36 with the aid of the chimney tray. While two flow path devices are shown, there can be additional flow path devices which are identical to the two shown, or vary in length and/or design.

Holes 15 can either be holes cut out of the surface of the feed flow path device(s) or they can be nozzles attached to the feed flow path device(s). In the instance that they are holes cut out of the surface of the feed flow path device(s) they can be cut by any well know means such as a plasma cutter, mechanical cutter, mechanical stamp or laser. In the instance that the holes are nozzles attached to the feed flow path device(s), the nozzles can be of simple or complex design and can be manufactured integrally with the feed flow path device. Alternatively, the nozzles can be permanently or removably attached/coupled to the feed flow path device. Examples of means for attaching the nozzles are welding, adhering or providing threaded openings in the feed flow path device along with corresponding threads on the nozzles.

The size, type and placement of holes are chosen based on at least the feed input characteristics, environmental characteristics inside the contacting column inlet section, desired feed distribution or combination thereof. In order to minimize operation and maintenance cost, it is desirable to maintain flow that is substantially liquid in the feed inlets outside of the contacting column. The conditions to maintain that flow substantially in liquid phase are based on the feed itself as well as any processes that have taken place upstream of the contacting column. Selecting the proper dimension and placement of the holes in the feed flow path device(s) allows for the vaporization of the feed in the desired locations inside the contacting column section.

FIGS. 2A and 2B show a specific implementation of a set of feed flow path devices in a central portion of a contacting column. In FIG. 2B, there is shown below the feed inlets 11 and 12 a lower separation section with a liquid distributor 21 and a separation means 22, i.e. packed bed. This lower separation section emits gas stream 33. When the feed inlet to a contacting column is located at such a vertical position as to have a gas stream rising through it, as shown, then the addition of a chimney tray 14 and chimneys 13 is advantageous. Gas stream 33 flows through the chimneys 13 and eventually to the upper separation section. Above the feed inlet section there is an upper separation section with separation means 20 (packed bed).

Numerous chimney tray geometries and designs are capable of being used with the feed flow path devices of the present invention as discussed above. The purpose of the chimney trays is two-fold. First, to allow even mixing and distribution of rising gas streams with the introduced feed gas streams from the feed flow path devices. Secondly, to catch and divert any liquid portion of feed streams and liquid falling from the separation section above to, for example, a liquid distributor located on top of the separation section below the chimney tray. FIGS. 2A and 2B show one embodiment of a chimney tray used in conjunction with the feed flow path devices.

The chimneys 13 in the present embodiment are defined by sidewalls formed by the vertical portion of the chimney tray 14. Horizontal chimney caps, shown in FIG. 2B, can be attached to one or more of the side portions defining chimney 13. The chimney caps can cover a portion or all of the chimney's upper opening. Alternatively, as shown in FIG. 2B, the chimney caps can extend past the boundaries of the chimney's upper opening.

The number of chimneys, their dimensions, location and construction can vary based off of the flow properties of gas stream 33 and gas streams 34. Preferably, the geometry of the chimney tray and the location of the chimneys reflect the geometry of the feed flow path device(s). In FIGS. 2A and 2B the chimneys can be seen arranged in rows parallel to the straight feed flow path devices. Additionally, it can be seen that while the center row consists of identically shaped and spaced chimneys 13, that the upper and lower rows consist of a series of differently sized, shaped and spaced chimneys that conform to both the geometry of the feed flow path devices (their inner edges are aligned in a straight line parallel to the feed flow path devices) and to the geometry of the contacting device column.

In practice, the selection of the number of chimneys, their dimensions and location is best determined through computational analysis using, for example; the column dimensions, feed flow path device parameters, gas stream 33 flow characteristics and gas stream 34 flow characteristics. A computer program can be used to optimize the design or one or more discrete cases can be simulated to determine the most appropriate design.

An aspect of the chimneys is to facilitate a substantially more homogeneous mixture between the two gas stream flows 33 and 34 than would be achieved without the chimney tray. The chimney tray can be designed in conjunction with the feed flow path devices or separately. One method of designing the system is by using Computational Fluid Dynamics software to simulate the interactions of the chimney tray, feed flow path devices and separation column to determine the optimal design of the system and its parts.

It is advantageous to the homogeneous mixture that the flow characteristics, e.g. velocity and density, of both flows are close to each other. Therefore, if the flow characteristics of the gas stream 34 are know, based off of the design of the feed flow path devices, then the height, location and open area can be designed to facilitate the homogeneous mixture.

As shown in FIG. 2B, the chimney area is less than the column area. Therefore, the flow exiting the chimneys has a higher velocity and density than the flow 33 in the bottom, open portion of the column section. Additionally, the chimney caps and the height of the vertical walls of the chimney tray 14 extend past the openings of in the feed flow path devices. As the flow 34 rises in the column section, it will disperse so that the velocity, density and local distribution decrease as the distance from the openings increases. The location of the top of the vertical walls of the chimneys and the chimney caps should be designed so that the flow characteristics of the flow exiting the chimneys and the local flow characteristics of the flow from the feed flow path devices are close to one another so that a substantially homogeneous mixture can be formed.

Other chimney geometries can be used to achieve the desired flow characteristics of the flow exiting the chimneys. Instead of the walls of the chimneys being vertical they can be disposed at an angle to funnel flow 33 to a narrower upper opening compared to the lower opening. This can be used to increase the local density and velocity of the flow as it leaves the chimneys. Alternatively, the walls of the chimney, and/or the bottom tray portion, can have one or more openings or be arranged in such a manner as to allow the flow 33 to exit the chimney from multiple locations. This can be used to keep the change in flow characteristics between flow 33 and the flow exiting the chimneys small.

The bottom portion of the chimney tray 14 can be, for example, horizontal as shown in FIG. 2B, it can slant to one direction or it can take the form of an inverted pyramid. In any case, there can be disposed one or more openings to allow the liquid flow 35 to exit the chimney tray. In the case that the tray bottom is slanted or an inverted pyramid, the opening for the liquid flow is preferably located at the point or area where the tray slants.

Figure 3A:
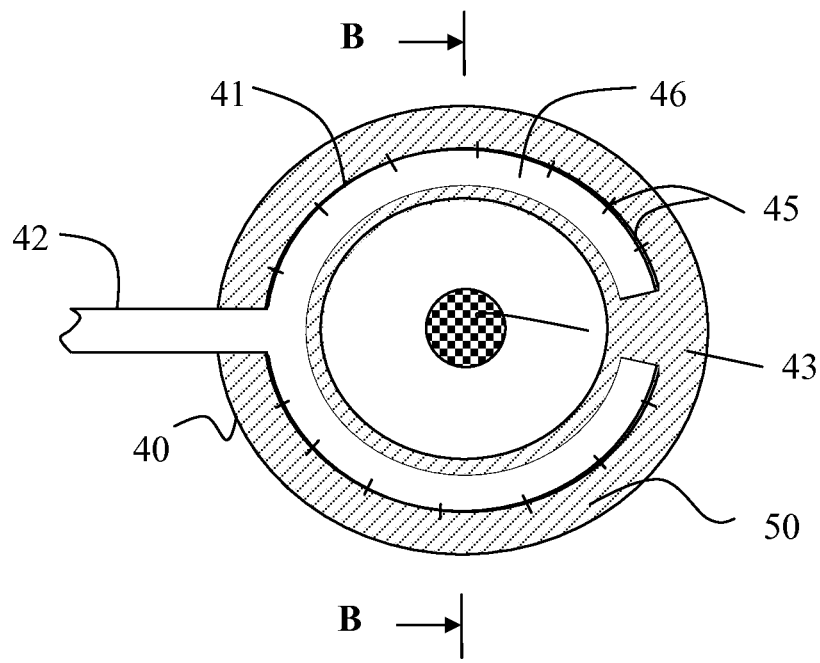
FIG. 3A is a top-down view of a section of a column with a feed distribution devices located in a lower section of a contacting column.
Figure 3B:
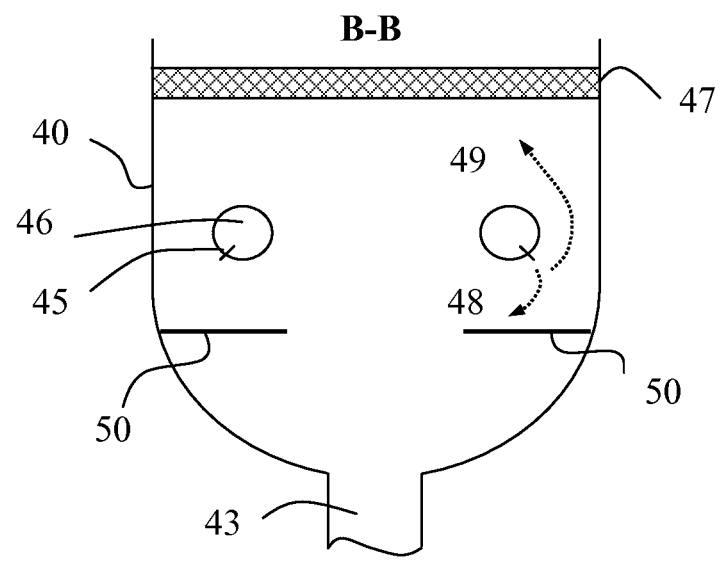
FIG. 3B is a side-view representation of the section in FIG. 3A.

In one embodiment, there is a flow loop in which a stream is taken from the column, the stream is heated and then the stream is reintroduced to the column. The section where the stream is reintroduced is shown in FIGS. 3A and 3B. This reintroduced stream is also considered a feed. The stream taken out from the column is often in its bubble point, meaning that any additional heat will cause vaporization (flashing) to take place when the stream is reintroduced to the column.

FIG. 3A shows the sidewall of a contacting device column 40 which encloses the interior portion of the contacting device column. The column 40 has feed inlet device 42. The feed inlet stream is reintroduced to the column after it has been heated in a loop described previously. The feed flow path device 46 has a suitable number of openings 45, located at the outer wall 41 of feed flow path device 46. The feed flow path device is shown as two circular pipe arcs which are located above the column bottom sump. The stream to the loop is taken from outlet 43. The feed stream from the said loop enters the feed inlet device 42. Above the feed inlet section there is an upper separation section with separation means 47 (packed bed).

The size and number of the holes 45 have been selected in such a way that the feed inlet stream inside flow path device 46 is maintained substantially in liquid phase. While the feed is preferably in a liquid phase, it can alternatively have a very small fraction of gas in it. As the inlet stream flows through the openings 45 into the feed inlet section it simultaneously vaporizes, or vaporizes more, and is in choked conditions. As the gas/liquid mixture comes out from the openings 45 it produces a gas stream 49 as a result of flashing (vaporization) and a liquid stream 48. In this particular embodiment, by using the flow path device it is possible to ensure that the gas stream 49 produced by flashing is distributed substantially uniformly into the upper separation section.

Since there is no, or virtually no, rising stream from below the feed flow path device, there is no need for a chimney and trays as described in the previous example. However, there can be use for a circular baffle 50 below the feed flow path device to deflect liquid from draining directly to the sump along the column walls. This baffle can be beneficial for level measurement nozzles and also for maintaining more steady liquid level at the sump.

A specific example for FIG. 3A has feed inlet device 42, which is a circular pipe having nominal diameter of 6 inch. The feed flow path device 46 is also a circular pipe with nominal diameter of 4 inch. The contacting device 40 has diameter of 1.8 m. The shape of the holes 45 is round and they all have same diameter of 14 mm. The total number of holes is 34 located as shown in FIG. 3B.

A hydrocarbon stream is introduced to the contacting device 40 via feed inlet device 42. The hydrocarbon stream has ASTM D86 distillation curve points according to the following table:

| | vol-% distilled | | | | | | |
|---|---|---|---|---|---|---|---|
| | 0 | 10 | 30 | 50 | 70 | 90 | 100 |
| at temp C. | 390 | 399 | 405 | 410 | 415 | 423 | 434 |

Additionally, the hydrocarbon stream has an API gravity of 36.96. This information fully characterizes the stream.

The pressure at the feed inlet device is adjusted by means of an upstream control valve at the inlet of the heat loop in order to obtain a pressure of 20 kPa(a) at the inlet to flow path device 46. The stream temperature is at 281.2 C after the heat loop while the temperature prior to the loop and leaving the contacting column is in its bubble point of 263 C. When the flow of the hydrocarbon stream through the holes is 952 kg/h the pressure drop is 10.7 kPa and the pressure in the contacting device is 9.3 kPa(a). When the pressure at the contacting device is lowered further there is no increase in the flow through the holes signifying that the flow has reached choked conditions i.e. reducing pressure downstream has no effect on the flow rate. In practice the contacting column is operated at a pressure of 1.7 kPa(a) and the hydrocarbon flow through the holes is at choked conditions.

At any section in a contacting device column in which there is a feed inlet that introduces feed to the system, there exists the potential for uneven distribution of the gas portion of the feed to the section above the feed inlet. Additionally, there exists the potential for local velocities of the gas portion of the feed to be either damaging or not ideal to the said section above. The placement of a feed distribution device which enables the flashing of the feed to take place at desired locations inside the feed inlet section allows for contacting device columns to operate more efficiently.

Additionally, designing a feed flow path device in accordance with the present invention allows the feed in the feed inlet to be maintained in a liquid or substantially liquid phase prior to entering the contacting column. This reduces the complexity of the distillation system as well as the harmful effects of gas phase, or high percentage gas phase, flows in the pipes and inlets leading to the contacting column. However, it will be recognized to those of ordinary skill in the art that the present device can also be utilized when the feed has more vapor in it but without obtaining all of the advantages of reducing harmful effects of the feed as when the feed is substantially liquid. One of ordinary skill in the art will also recognize additional advantages to the present invention and various geometries of feed flow path devices, chimneys, trays and designs of openings and nozzles from the feed flow path devices not described herein that do not depart from the scope of the present invention.

The invention claimed is:

1. A contacting column section comprising;
    a feed inlet configured to contain a feed which is at least partially liquid, and
    a feed flow path device located inside the section of the column and coupled to the feed inlet, the feed flow path device having a series of openings, each of the openings having an opening area selected to cause feed flow through the opening to be in choked condition and simultaneously to at least partially vaporize.

2. A contacting column section according to claim 1, wherein there is a separation section above, below or above and below the contacting column section and the separation section is for separation, distillation, heat transfer, extraction, wash operation or absorption.

3. A contacting column section according to claim 1, wherein the feed flow path device comprises two or more feed flow paths organized in series or in parallel or both parallel and series.

4. A contacting column section according to claim 1, wherein the feed flow is divided into at least two feed flow parts and each feed flow part is introduced via its own feed inlet and feed flow path device.

5. A contacting column section according claim 1,further comprising;
at least one additional feed inlet, each additional feed inlet containing feed which is liquid or at least partially liquid at a certain pressure, and
each additional feed is compositionally different from at least one other feed, wherein each additional feed inlet is coupled to its own respective feed flow path device located inside the section of the column, each feed flow path device having a series of openings, each of the openings having an opening area selected to cause feed flow through the opening to be in choked condition and simultaneously to at least partially vaporize.

6. A contacting column section according to claim 1,further comprising;
at least one additional feed inlet, each additional feed inlet containing feed which is liquid, and
each additional feed is compositionally similar to the feed, wherein each additional feed inlet is coupled to the feed flow path device.

7. A contacting column section according to claim 1, further comprising,
a liquid collecting device located at least partially below the feed flow path device and capable of redirecting a liquid portion of the feed entering the column section.

8. A contacting column section according to claim 7, wherein the liquid collecting device is conformed to the feed flow path of the feed flow path device and re-directs at least a portion of a gas stream from below the liquid collecting device to a point above the feed flow path device.

9. A contacting column section according to claim 1, wherein the total opening area of all openings of the feed flow path device is configured so that the flow though each and every opening is in a choked condition.

10. A contacting column section comprising;
a feed inlet containing a feed at a first pressure which is liquid or at least partially liquid,
a section of the column operated at a second pressure,
a feed flow path device located inside the section of the column and coupled to the feed inlet, the feed flow path device containing feed from the feed inlet and having a series of openings for the feed to enter the section of the column, each opening having an opening area,
a difference between the first and second pressure, and wherein the feed flow as it flows through all of the openings simultaneously both vaporizes partially or totally or vaporizes more and is in choked condition.

* * * * *